I. FRÉCHETTE & C. L. GIRARD.

Assignors, by mesne assignments, to the NATIONAL AUTOMATIC LUBRICATOR COMPANY.

CAR AXLE LUBRICATOR.

No. 10,767. Reissued Sept. 28, 1886.

Attest:
Geo. H. Bott.
A. N. Jesbera.

Inventors:
Isaïe Fréchette
Charles L. Girard
By David A. Burr
their Atty.

N. PETERS, Photo-Lithographer, Washington, D. C.

UNITED STATES PATENT OFFICE.

ISAÏE FRÉCHETTE AND CHARLES LOUIS GIRARD, OF ST. HYACINTHE, QUEBEC, CANADA, ASSIGNORS, BY MESNE ASSIGNMENTS, TO THE NATIONAL AUTOMATIC LUBRICATOR COMPANY, OF PORTLAND, MAINE.

CAR-AXLE LUBRICATOR.

SPECIFICATION forming part of Reissued Letters Patent No. 10,767, dated September 28, 1886.

Original No. 320,343, dated June 16, 1885. Application for reissue filed July 21, 1886. Serial No. 208,086.

*To all whom it may concern:*

Be it known that we, ISAÏE FRÉCHETTE and CHARLES LOUIS GIRARD, both of the city of St. Hyacinthe, in the county of St. Hyacinthe, Province of Quebec, Canada, have invented new and useful Improvements in Lubricators for Railway-Car Axles, &c.; and we do hereby declare that the following is a full, clear, and exact description of the same.

This invention has reference to that class of lubricators for the journals of the axles of railway-cars and for other journals which are so constructed and arranged that the device may be readily placed in the axle-box and removed therefrom while the axle is in its position in the said axle-box.

The particular features of improvement which constitute our invention will be hereinafter fully set forth and claimed.

Figure 1:
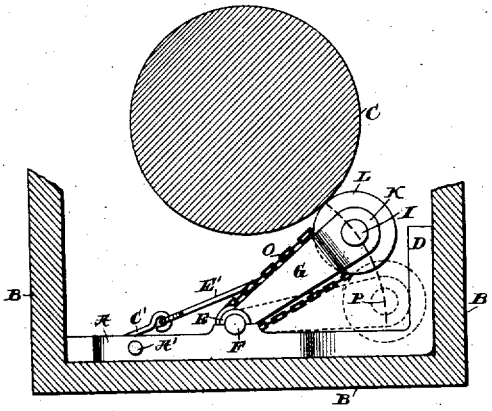
Figure 3:
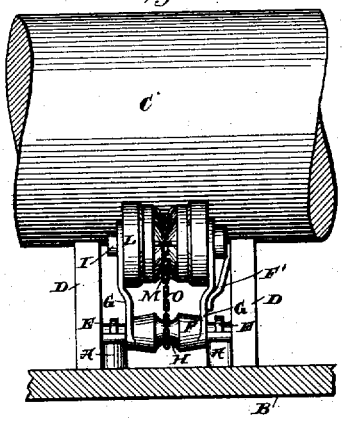
Figure 2:
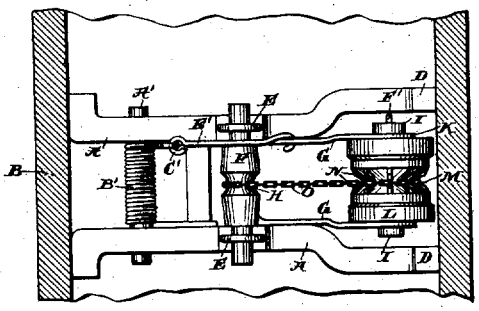
Figure 4:
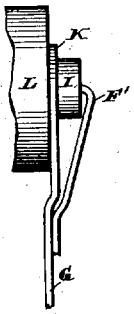
Figure 5:
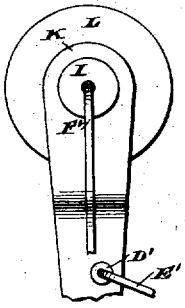
Figure 6:
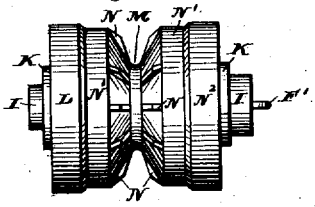

In the drawings hereunto annexed, wherein similar letters of reference indicate like parts, Figure 1 is a side elevation of a lubricator embodying the invention. Fig. 2 is a plan of the lubricator shown in Fig. 1. Fig. 3 is an end elevation of the lubricator shown in Fig. 1; and Figs. 4, 5, and 6 are details of construction.

A represents a frame made, as shown, to fit loosely within the lower part of the axle-box B, and C is the car-axle, represented as in its customary position relatively to the bottom of the axle-box.

The frame A is constructed with upper extensions, D, for the purpose of steadying the lower part thereof upon the bottom of the axle-box B; or, in other words, to prevent the frame from canting up or being raised from the bottom of the axle-box by the action of the working parts attached thereto.

Upon the frame A, by eyes E, or similar contrivances, is attached a transverse axis or axial rod or shaft, F, having two arms, G, secured thereto or made integral therewith. The part of the axis or shaft F situated between the two arms G is enlarged, and in this enlargement a circumferential groove, H, is formed. The upper ends of the arms G terminate in eyes K, through which a pin, I, passes. On this pin is situated a grooved lubricating-roller, L, arranged to freely revolve on said pin I. The groove M of the roller L is preferably of V configuration, and provided with ordinary projections, N, (see Fig. 6,) for imparting the motion of the lubricating-roller L positively to an endless oil-conveying chain, O, which passes over said roller at one end and over the axial rod or shaft F at the other. (See Figs. 1, 2, and 3.)

From the above description it will be understood that the roller L, carrying the chain O, is free to vibrate upon the axis F as a center, (as indicated by the arc of a circle, P, shown in dotted lines in Fig. 1,) and that by pressing the periphery of the roller L against the periphery of the axle C the roller L is revolved by the axle, thereby causing the chain O to travel in the grooves H and M of the rod or shaft F and roller L, so that if the lower part of the axle-box B is filled with fluid lubricating material to such a level as that the lower part of the chain O will be immersed in it the lubricating material will be carried up by the chain O into the groove M, and thence spread upon the roller L, and by it distributed upon the axle C.

As the space for inserting the device into the box of a railway-car axle is much contracted, and particularly so when the axle is provided with an outer collar, as is usually the case, it is necessary to allow the swinging arms G to drop by turning them upon their axis F in the direction indicated by the arc P, Fig. 1, down to, or a little below, the position indicated by the dotted lines in said Fig. 1, to permit the device to be passed with comparative ease into and out of the axle-box when desired, so that should the device be found defective by wear, &c., it can be readily removed and repaired or replaced by a new one, as desired.

It has been hereinbefore stated or inferred that the roller L is to be pressed up against the axle C. Its capability of being so pressed up by swinging on the pivotal axis F will compensate for the differences of position of the axle C, caused by its wear and the wear of its bearings, or by reason of any change of said position from other causes.

For the purpose of pressing the periphery of the roller L against the periphery of the axle C an almost countless variety of springs, and even weights, may be arranged. We shall, however, confine ourselves to showing in the drawings, and shall confine this specification to describing, only one method or arrangement of spring, and consider that to be sufficient to cover all other arrangements for this said purpose.

On any suitable bar, A′, secured in the frame A, a coiled spring, B′, is secured. This coiled spring terminates, as shown, in an eye, C′. In one of the arms G an opening, D′, is formed, (see Fig. 5,) and a link, E′, engaging said opening connects the arm G with the eye C′. By this arrangement the tension of the spring B′ upon the arm G keeps the periphery of the roller L pressed with sufficient force against the periphery of the axle C, and enables the arms G G to be readily depressed, as indicated by dotted lines in Fig. 1, whenever it is desired to so depress them, which will be the case when the device is to be put in or taken out of the axle-box.

F′ is a spring-arm secured on one of the arms G, as shown, for keeping the axial pin I, upon which the roller L revolves, in place. Any other contrivance—such as a nut—may be arranged for this purpose. Nevertheless, the spring-arm F′ gives an important facility for readily removing and replacing the pin I and the roller L.

It will be remarked that the roller L is made with the parts of its periphery N next to the groove M somewhat smaller in diameter than the diameter of the outer parts, $N^2$. This provides a space for a film of oil to form in to touch the axle C, and give a much better lubricating than would be obtained by surfaces coming into close bearing contact.

We claim as our invention—

1. In a detachable lubricating device for car-axles and other journals, the combination of an independent yielding lubricating-roller to be rotated by contact with the car-axle or journal, a parallel rod or shaft, a movable frame, upon and by which the roller and shaft are supported, and an endless revolving oil-conveying chain carried over the roller and shaft, substantially in the manner and for the purpose herein set forth.

2. In a lubricating device for car-axles and other journals, the combination, with a movable frame, swinging arms pivoted upon a common axis carried by the frame, a spring upholding said arms, and a grooved lubricating-roller mounted to rotate between their outer ends and vibrate therewith about their pivotal axis as a center, of an endless oil-conveying chain extended between and carried over both the roller and the pivotal axis of its swinging supporting-arms to be driven by the rotation of the roller and maintained in position by said pivotal axis, substantially in the manner and for the purpose herein set forth.

3. The combination, with the axle C, of the roller L, arms G, axis F, chain O, operating-spring B′, and frame A, the whole constructed and arranged substantially as and for the purpose set forth.

4. The combination, with the arms G G, swinging upon a common pivotal axis, the transverse detachable pin I, connecting their outer ends, and the roller L, revolving upon said pin, of the spring-arm F′, engaging the outer end of said pin, substantially in the manner and for the purpose herein set forth.

ISAÏE FRÉCHETTE.
CHARLES LOUIS GIRARD.

Witnesses:
H. LATOUR,
F. CHAGNON.